United States Patent
Spear et al.

(10) Patent No.: US 7,702,953 B2
(45) Date of Patent: Apr. 20, 2010

(54) STORAGE MANAGEMENT IN CASCADED REPLICATION OF DATA

(75) Inventors: Gail Andrea Spear, Tucson, AZ (US); Michael E. Fractor, Haifa (IL); Shachar Fienblit, Ein Ayala (IL)

(73) Assignee: International Business Machines Corporation, Armonk, NY (US)

( * ) Notice: Subject to any disclaimer, the term of this patent is extended or adjusted under 35 U.S.C. 154(b) by 583 days.

(21) Appl. No.: 11/620,012

(22) Filed: Jan. 4, 2007

(65) Prior Publication Data

US 2008/0168303 A1 Jul. 10, 2008

(51) Int. Cl.
G06F 11/00 (2006.01)
(52) U.S. Cl. .............................................. 714/6; 714/5
(58) Field of Classification Search .................. 714/5, 714/6, 7
See application file for complete search history.

(56) References Cited

U.S. PATENT DOCUMENTS

| | | | |
|---|---|---|---|
| 6,202,135 B1 * | 3/2001 | Kedem et al. ................ | 711/162 |
| 6,282,610 B1 * | 8/2001 | Bergsten ...................... | 711/114 |
| 6,591,351 B1 * | 7/2003 | Urabe et al. ................. | 711/162 |
| 6,658,542 B2 * | 12/2003 | Beardsley et al. ........... | 711/162 |
| 6,704,839 B2 * | 3/2004 | Butterworth et al. ........ | 711/114 |
| 6,742,138 B1 * | 5/2004 | Gagne et al. .................. | 714/6 |
| 6,745,303 B2 * | 6/2004 | Watanabe .................... | 711/161 |
| 6,947,981 B2 | 9/2005 | Lubbers et al. | |
| 6,996,672 B2 * | 2/2006 | Lubbers et al. ............. | 711/114 |
| 7,007,042 B2 * | 2/2006 | Lubbers et al. ............. | 707/202 |
| 7,047,376 B2 * | 5/2006 | Horiuchi ...................... | 711/161 |
| 7,089,384 B2 * | 8/2006 | Tross et al. .................. | 711/162 |
| 7,134,044 B2 * | 11/2006 | Day et al. ...................... | 714/6 |
| 7,139,933 B2 * | 11/2006 | Hsu et al. ...................... | 714/6 |
| 7,149,919 B2 * | 12/2006 | Cochran et al. ................ | 714/4 |
| 7,188,272 B2 * | 3/2007 | Bartfai et al. ................... | 714/6 |
| 7,194,590 B2 * | 3/2007 | Achiwa et al. ............. | 711/162 |
| 7,225,307 B2 * | 5/2007 | Micka et al. ................. | 711/161 |
| 7,228,398 B2 * | 6/2007 | Iwamura et al. ............. | 711/162 |
| 7,234,033 B2 * | 6/2007 | Watanabe .................... | 711/162 |
| 7,243,207 B1 * | 7/2007 | Prakash et al. ............... | 711/202 |
| 7,308,546 B1 * | 12/2007 | Colgrove et al. ............ | 711/162 |

(Continued)

OTHER PUBLICATIONS

R.P. King, et al., "Management of a Remote Backup Copy for Disaster Recovery", ACM Transactions on Database Systems, vol. 16, No. 2, Jun. 1991, pp. 338-368.

(Continued)

*Primary Examiner*—Robert Beausoliel
*Assistant Examiner*—Joshua P Lottich
(74) *Attorney, Agent, or Firm*—Rabindranath Dutta; Konrad Raynes & Victor LLP

(57) ABSTRACT

Provided are a method, system, and article of manufacture, wherein synchronous replication of data is initiated from a first site to a second site. At least one part of the data is sent asynchronously from the second site to a third site, wherein the asynchronously sent at least one part of the data is stored at the second site while the at least one part of data is in flight from the second site to the third site. The at least one part of the data stored at the second site is deleted, in response to the at least one part of the data being securely stored at the third site.

28 Claims, 8 Drawing Sheets

U.S. PATENT DOCUMENTS

| | | | |
|---|---|---|---|
| 7,310,743 B1* | 12/2007 | Gagne et al. | 714/6 |
| 7,370,172 B2* | 5/2008 | Manbert et al. | 711/170 |
| 7,370,228 B2* | 5/2008 | Takahashi et al. | 714/6 |
| 7,418,549 B2* | 8/2008 | Abe | 711/114 |
| 7,421,550 B2* | 9/2008 | Kaiya et al. | 711/162 |
| 7,430,646 B2* | 9/2008 | Cox et al. | 711/162 |
| 7,441,145 B2* | 10/2008 | Hiraiwa et al. | 714/6 |
| 7,451,346 B2* | 11/2008 | Katsuragi et al. | 714/6 |
| 7,467,234 B2* | 12/2008 | Ikegaya et al. | 709/248 |
| 7,478,101 B1* | 1/2009 | Manley | 707/100 |
| 7,526,622 B1* | 4/2009 | Bonwick et al. | 711/162 |
| 7,577,868 B2* | 8/2009 | Aidun | 714/6 |
| 7,600,087 B2* | 10/2009 | Yamagami | 711/162 |
| 2003/0126387 A1* | 7/2003 | Watanabe | 711/161 |
| 2003/0182328 A1 | 9/2003 | Paquette et al. | |
| 2004/0034808 A1* | 2/2004 | Day et al. | 714/6 |
| 2004/0039959 A1* | 2/2004 | LeCrone et al. | 714/6 |
| 2005/0071710 A1* | 3/2005 | Micka et al. | 714/6 |
| 2005/0081091 A1* | 4/2005 | Bartfai et al. | 714/6 |
| 2005/0188254 A1* | 8/2005 | Urabe et al. | 714/6 |
| 2006/0047905 A1* | 3/2006 | Matze et al. | 711/114 |
| 2006/0107098 A1* | 5/2006 | Maki et al. | 714/6 |
| 2006/0161737 A1* | 7/2006 | Martin et al. | 711/147 |
| 2007/0061616 A1* | 3/2007 | Watanabe | 714/6 |
| 2007/0079171 A1* | 4/2007 | Aidun | 714/6 |
| 2007/0100909 A1* | 5/2007 | Padovano et al. | 707/204 |
| 2007/0180308 A1* | 8/2007 | Zohar et al. | 714/6 |

OTHER PUBLICATIONS

T. Leehane, "Level II Technical Support in a Distributed Computing Environment", ACM, 1997, pp. 95-152.

PCT International Search Report and Written Opinion dated Mar. 19, 2008 for Application No. PCT/EP2007/064214 filed Dec. 19, 2007.

* cited by examiner

STORAGE MANAGEMENT IN CASCADED REPLICATION OF DATA

BACKGROUND

1. Field

The disclosure relates to a method, system, and article of manufacture for storage management in the cascaded replication of data.

2. Background

Information technology systems, including storage systems, may need protection from site disasters or outages, and features for data migration, data backup, and data duplication. Implementations for disaster or outage recovery, data migration, data backup, and data duplication may include replication of data in storage systems. Such mirroring or replication of data may involve interactions among hosts, storage systems and connecting networking components of the information technology system.

Synchronous replication is an operation that allows the shadowing of application system data from a first site to a second site. In synchronous replication, the updates performed by a host application to the volumes at the first site are synchronously shadowed onto the remote volumes at the second site. In synchronous replication, write updates are ensured on both copies (the copy at the first and second sites) before the write is considered to be completed for the host application. Furthermore, in synchronous replication the host application does not get the "write complete" condition until the update is synchronously done in both the first and the second site. Therefore, from the perspective of the host application the data at the volumes at the second site is equivalent to the data at the volumes at the first site.

Synchronous replication increases the response time as compared to an asynchronous replication, and this is inherent to the synchronous operation. The overhead comes from the additional steps that are executed before the write operation is signaled as completed to the host application. Also synchronous replication between the first site and the second site may be comprised of signals that travel through the links that connect the two sites, and the overhead on the response time of the host application write operations will increase proportionally with the distance between the two sites. Therefore, the distance affects a host application's write response time. In certain implementations, there may be a maximum supported distance for synchronous replication operations referred to as the synchronous communication distance.

In an asynchronous replication, updates of the volumes of a first site onto the volumes of a second site are performed in an asynchronous manner, while the host application is running. In asynchronous replication, the host application receives a write complete response before the update is copied from the volumes of the first site to the volumes of the second site. In this way, a host application's write operations are free of the typical synchronous overheads. Therefore, asynchronous replication is suitable for remote copy solutions at very long distances with minimal impact on host applications. There is no overhead penalty upon the host application's write such as in synchronous replication. However, asynchronous copy operations may not continuously maintain an equivalent copy of the data of the first site at the second site.

Many customers are interested in a 3-site replication solution in which the first and second sites, referred to as local and intermediate sites respectively, are within "metro distances" of each other, where in certain situations "metro distances" are distances that are less than 300 km. In other situations, "metro distances" could be less than a value that is different from 300 km., e.g., "metro distances" could be defined as distances that are less than 250 km. The third site, also referred to as a remote site, is at a "continental distance" from the intermediate site, where "continental distances" are distances that are 300 km. or more in certain situations. In other situations, "continental distances" could be more than or equal to a value that is different from 300 km., e.g., "continental distances" could be defined as distances that are 250 km. or more. However in all situations, continental distances are greater than metro distances. Synchronous replication is used between two storage devices at the local and intermediate sites, where the local and intermediate sites may be designated as site-A and site-B respectively. Asynchronous replication is used between the storage devices in the intermediate and remote sites, where the intermediate and remote sites are designated as site-B and site-C respectively. In such a 3-site replication solution, if any one site is not operational, there is no data loss, and a user can choose to recover data and/or operations at either of the two remaining sites. In such solutions, a volume at site-A may be referred to as an A-volume, a volume at site-B may be referred to as a B-volume, and a volume at sited C may be referred to as a C-volume.

SUMMARY OF THE PREFERRED EMBODIMENTS

Provided are a method, system, and article of manufacture, wherein synchronous replication of data is initiated from a first site to a second site. At least one part of the data is sent asynchronously from the second site to a third site, wherein the asynchronously sent at least one part of the data is stored at the second site while the at least one part of data is in flight from the second site to the third site. The at least one part of the data stored at the second site is deleted, in response to the at least one part of the data being securely stored at the third site.

In additional embodiments, the at least one part of the data is stored in a space efficient storage volume at the second site, wherein space efficient storage volumes are created as empty storage volumes, wherein a predefined amount of physical storage space is incrementally allocated for the space efficient storage volumes from a storage repository in response to writing to the space efficient storage volumes, and wherein the allocated physical storage space is returned to the storage repository in response to the physical storage space being no longer needed.

In still additional embodiments, the data is write Input/Output (I/O) data received from a host coupled to the first site. The data in cache and non-volatile storage is discarded at the second site, in response to determining that the write I/O data has been transferred successfully from the second site to the third site before the write I/O data has been destaged to the storage repository at the second site. The physical storage space associated with the space efficient storage volumes at the second site is released, in response to determining that the write I/O data has not been transferred successfully from the second site to the third site before the write I/O data has been destaged to the storage repository at the second site.

In further embodiments, the first site, the second site, and the third site comprise storage controllers, wherein the synchronous replication of data from the first site to the second site is performed in parallel with the asynchronous sending of the at least one part of the data from the second site to the third site. A predetermined amount of storage is allocated to a storage repository at the second site, and in response to an exhaustion of storage space at the second site, the synchronous replication of data from the first site to the second site is suspended. In response to excess data accumulating at the first site, in response to a suspension of the synchronous replication of data from the first site to the second site, the first site is resynchronized to the third site.

In yet further embodiments, in response to a failure of the first site, remaining data at the second site is transferred to the third site, wherein the remaining data is data that has yet to be transferred from the second site to the third site at the time of the failure of the first site. The third site is used for data recovery. In response to a failure of the second site, or the failure of a link between the first site and the second site, or a failure of a link between the second and third site, the first site is connected to the third site and the data in flight between the second site and third site is resynchronized between the first site and third site.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

In a 3-site replication solution comprising a local site (also referred to as site-A) with storage volumes referred to as A-volumes, an intermediate site (also referred to as site-B) with storage volumes referred to as B-volumes, and a remote site (also referred to as site-C) with storage volumes referred to as C-volumes, if any one site is lost, there is no data loss, and a user can choose to recover operations at either of the two remaining sites. In 3-site replication solutions, two or more additional storage copies have to be maintained for every production volume.

Certain embodiments allow the user to allocate a smaller amount of storage at site-B. In certain embodiments, the B-volume copy is not a full copy of the A-volume, but a journal copy that stores the data in flight between site-A and site-C. In response to the data being secured at site-C, the data is released from the journal copy at site-B. Such embodiments may significantly reduce the cost of storage at site-B. Certain embodiments use a space efficient volume as exemplary B-volumes in site-B.

Figure 1:
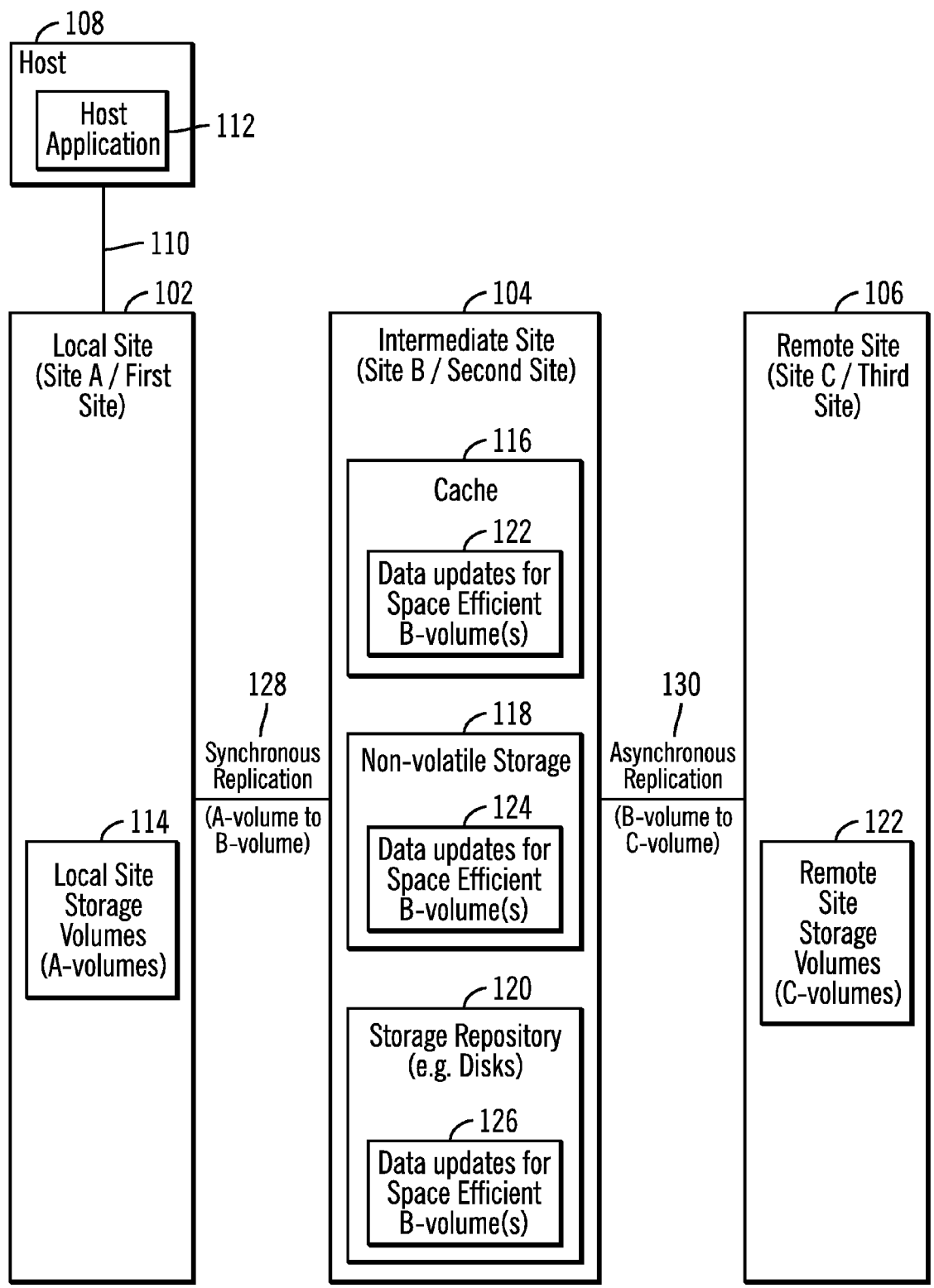
FIG. 1 illustrates a block diagram of a computing environment, in accordance with certain embodiments.

FIG. 1 illustrates block diagram of a computing environment 100 utilizing three storage sites, such as a local site 102, an intermediate site 104, and a remote site 106 connected by data interface channels, such as, the Enterprise System Connection* (ESCON)* channel or any other data interface mechanism known in the art [e.g., fibre channel, Storage Area Network (SAN) interconnections, etc.]. Each of the storage sites 102, 104, 106 may comprise one or more storage controllers that are coupled to storage volumes. The local site 102, the intermediate site 104, and the remote site 106 may also be referred to as the first site or site-A, the second site or site-B, and the third site or site-C respectively.

IBM, Enterprise Storage Server, Enterprise Systems Connection, ESCON, OS/390 are trademarks or registered trademarks of IBM Corporation.

The three storage sites 102, 104, 106 may be at three different sites with the local site 102 and the intermediate site 104 being within a synchronous communication distance of each other. The synchronous communication distance between two storage sites is the distance up to which synchronous communication is feasible between the two sites. In certain embodiments the local site 102 and the intermediate site 104 are within a metro distance", i.e., less than 300 km., of each other.

The remote site 106 may be a long distance away from the intermediate site 104 and the local site 102, such that, synchronous copying of data from the intermediate site 104 to the remote site 106 may be time consuming or impractical. The communication between the intermediate site 104 and the remote site 106 is asynchronous.

In certain alternative implementations, there may be less than three sites. For example, the local site 102 and the intermediate site 104 may be at the same site. In additional alternative embodiments, there may be more than three sites. Furthermore, functions of a plurality of sites may be integrated into a single site, e.g., functions of the local site 102 and the intermediate site 104 may be integrated into a single site.

The local site 102 is coupled to a host 108 via data interface channel 110. While only a single host 108 is shown coupled to the local site 102, in certain embodiments of the invention, a plurality of hosts may be coupled to the local site 102. The host 108 may be any computational device known in the art, such as a personal computer, a workstation, a server, a mainframe, a hand held computer, a palm top computer, a telephony device, network appliance, etc. The host 108 may include any operating system (not shown) known in the art, such as the IBM* OS/390* operating system. The host 108 may include at least one host application 112 that sends Input/Output (I/O) requests to the local site 102.

IBM, Enterprise Storage Server, Enterprise Systems Connection, ESCON, OS/390 are trademarks or registered trademarks of IBM Corporation.

The sites 102, 104, and 106 are coupled to storage volumes, such as, local site storage volumes 114, intermediate site storage volumes distributed among a cache 116, a non-volatile storage 118, and a storage repository 120, and remote site storage volumes 122. Certain of the storage volumes coupled to the sites 102, 104, 106 may be configured as a Direct Access Storage Device (DASD), one or more RAID ranks, Just a bunch of disks (JBOD), or any other data repository system known in the art. In certain embodiments, the storage volumes coupled to the intermediate site 104 are space efficient storage volumes.

For the purposes of the disclosure, the local site 102 may be referred to as site-A, the intermediate site 104 as site-B, the remote site 106 as site-C. Additionally, the local site storage volumes 114 are referred to as A-volumes, the intermediate site storage volumes are referred to as B-volumes, and the remote site storage volumes 122 are referred to as C-volumes.

The cache 116 included in the intermediate site 104 comprises volatile memory to store tracks. The intermediate site 102 may also include a non-volatile storage (NVS), such as non-volatile storage 118. The cache 116, the non-volatile storage 118, and the storage repository 120 may include data updates 122, 124, 126 for space efficient storage volumes.

Synchronous replication 128 takes place between the local site 102 and the intermediate site 104, and in synchronous replication updates to the A-volumes are copied to B-volumes. Asynchronous replication 130 takes place between the intermediate site 104 and the remote site 106, and in asynchronous replication updates to the B-volumes are copied to C-volumes.

Therefore, FIG. 1 illustrates a computing environment 100 where a host application 112 sends I/O requests to a local site 102. The local site 102 synchronously copies data updates to the intermediate site 104, and the intermediate site 104 asynchronously copies data updates to the remote site 106. In certain embodiments, a synchronous replication 128 of data is initiated from the first site 102 to the second site 104. At least one part of the data is asynchronously replicated 130 from the second site 104 to the third site 106, wherein the asynchronously sent at least one part of the data is stored at the second site 104 while the at least one part of data is in flight from the second site 104 to the third site 106. The at least one part of the data stored at the second site 104 is deleted, in response to the at least one part of the data being securely stored at the third site 106.

Figure 2:
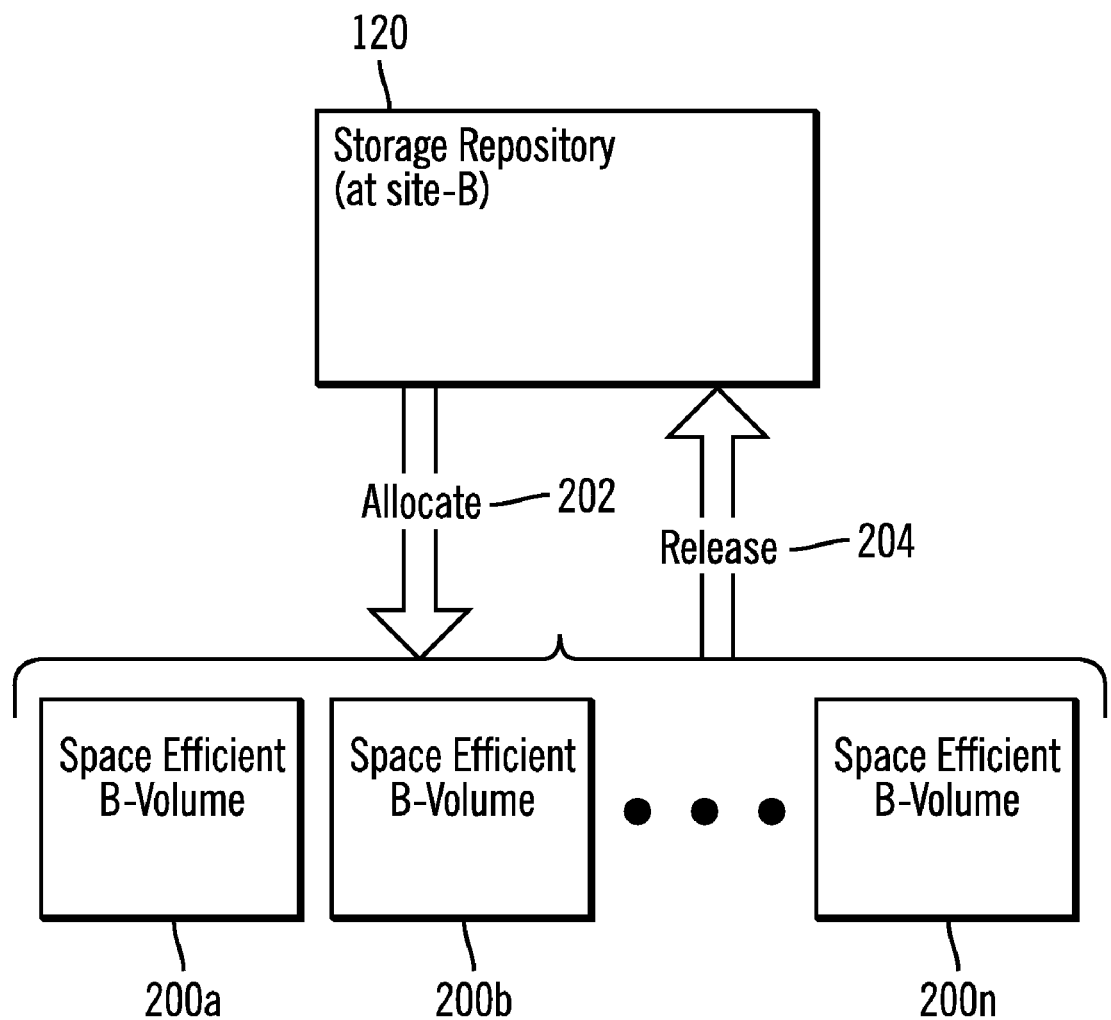
FIG. 2 illustrates a block diagram of space efficient volumes being allocated, wherein the storage space of the space efficient volumes is released from a storage repository, in accordance with certain embodiments.

FIG. 2 illustrates a block diagram of space efficient volumes being allocated and wherein storage space for the space efficient volumes is released from a storage repository 120, in accordance with certain embodiments.

Space efficient volumes 200a, 200b, . . . 200n are initially created as empty volumes. When space efficient volumes are written, physical storage space is allocated 202 from the storage repository 120 in increments of 64 Kbytes, where the increments of 64 Kbytes may be referred to as allocation units. In other embodiments the allocation units could be different from 64 KBytes. When the physical storage space is no longer needed the physical storage space can be released 204 and returned to the storage repository 120.

Therefore, FIG. 2 illustrates certain embodiments wherein the at least one part of the data that undergoes asynchronous transmission between the second site 104 and the third site 104 is stored in a space efficient storage volume, such as space efficient storage volume 200a, at the second site 104, wherein space efficient storage volumes are created as empty storage volumes, and wherein a predefined amount of physical storage space is incrementally allocated for the space efficient storage volumes from a storage repository 120 in response to writing to the space efficient storage volumes, and wherein the allocated physical storage space is returned to the storage repository 120 in response to the physical storage space being no longer needed.

Figure 3:
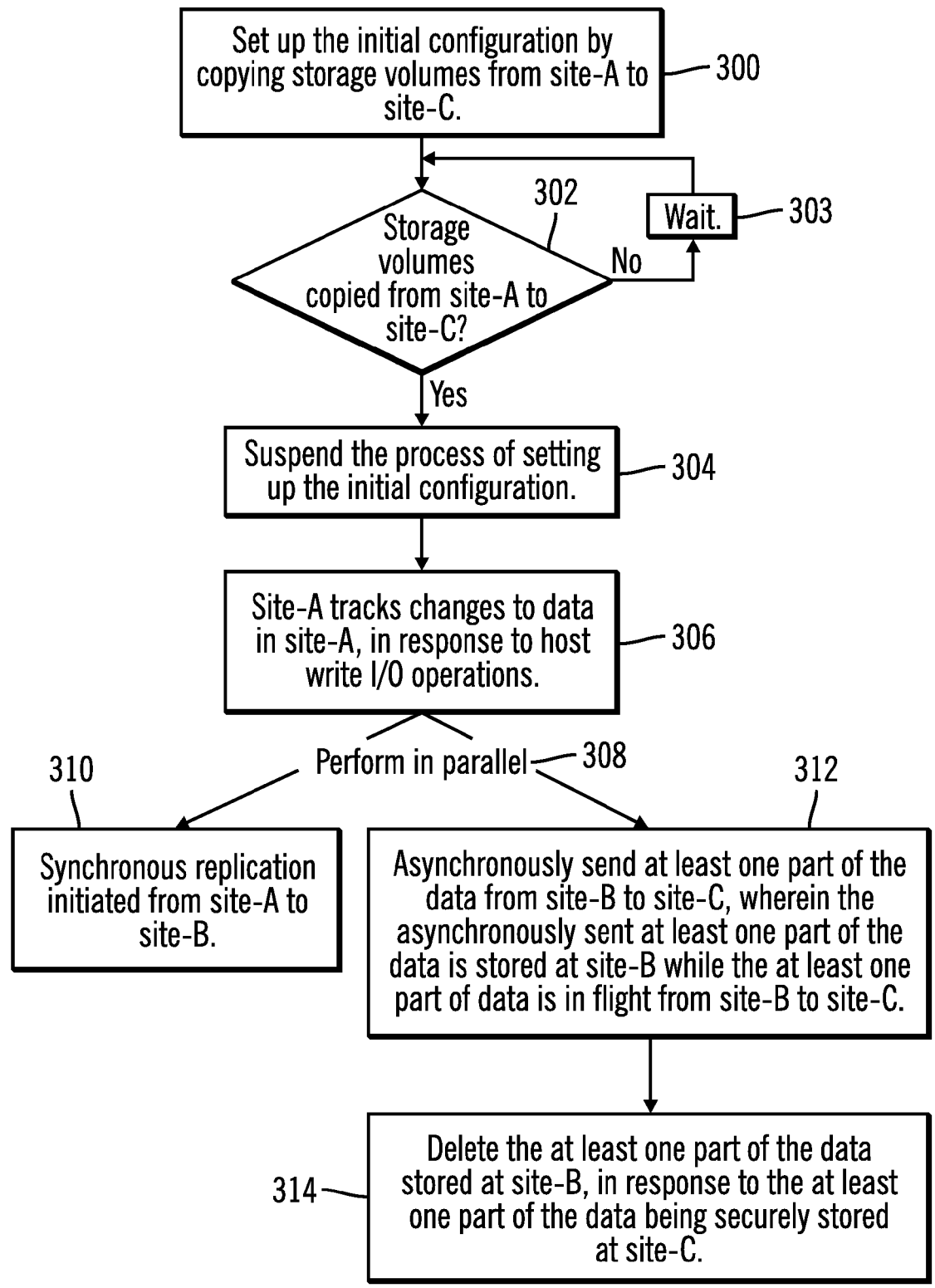
FIG. 3 illustrates operations for cascaded replication of data, in accordance with certain embodiments.

FIG. 3 illustrates operations for cascaded replication of data, in accordance with certain embodiments. The operations illustrated in FIG. 3 may be performed by one or more processes implemented in the computing environment 100.

Control starts at block 300, where an initial configuration of the computing environment 100 is set up by copying storage volumes from site-A 102 to site-C 106. A determination is made (at block 302) as to whether storage volumes have been copied from site-A 102 to site-C 106. If so, then the process of setting up the initial configuration is suspended (at block 304). Otherwise, the process waits (at block 303) and again determines whether storage volumes have been copied from site-A 102 to site-C 106.

From block 304, control proceeds to block 306 where a process in site-A 102 tracks changes to data in site-A, in response to write I/O operations from the host 108. Control proceeds in parallel (block 308) to blocks 310 and 312 from block 306.

At block 310, synchronous replication 128 is initiated from site-A 102 to site-B 104. In parallel to the execution of block 310, blocks 312 and 314 may be executed, wherein at block 312, at least one part of the data is asynchronously sent from site-B 104 to site-C 106, wherein the asynchronously sent at least one part of the data is stored at site-B 104 while the at least one part of data is in flight from site-B 104 to site-C 106. However, it should be noted that although synchronous replication 128 in block 310 occurs in parallel with asynchronous replication 130 in block 312, operations are serialized for any one data update, i.e., a data update is first transferred synchronously from site-A 102 to site-B 104, and then transferred asynchronously from site-B 104 to site-C 106. From block 312 control proceeds to block 314 where the at least one part of the data stored at site-B 104 is deleted, in response to the at least one part of the data being securely stored at site-C 106.

Therefore, FIG. 3 illustrates certain embodiments, where to establish the 3-site configuration data is initially copied from site-A 102 directly to site-C 106. Once the initial copying is completed, the setting up of the initial configuration can be suspended. Site-A 102 may track changes due to write I/Os from the host 108, and operations can be established from site-B 104 to site-C 106 with asynchronous copy and from site-A 102 to site-B 104 with synchronous copy. The updates from the host 108 will flow from site-A 102 to site-B 104 to site-C 106.

When host write I/O is sent to site-A 102, because of synchronous replication 128 such host write I/O's will be sent to site-B 104 before the completion of the write I/O is indicated to the host 108. A background process in site-B 104 may send the data to the C-volumes 122, form consistency groups, and preserve consistent sets of data.

Figure 4:
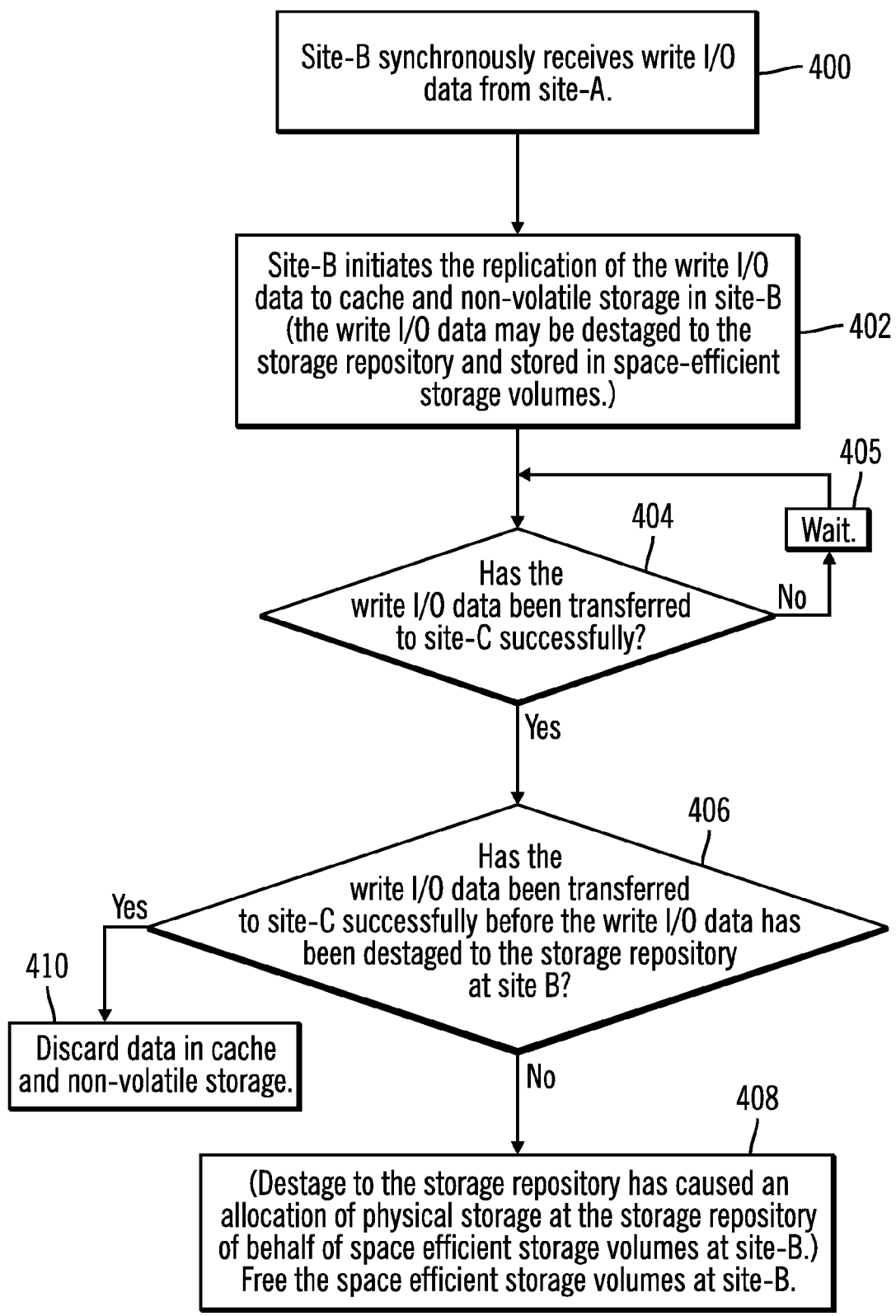
FIG. 4 illustrates operations for the usage of space-efficient storage volumes, in accordance with certain embodiments.

FIG. 4 illustrates operations that illustrate the usage of space-efficient storage volumes 200a . . . 200n, in accordance with certain embodiments. The operations illustrated in FIG. 4 may be performed by one or more processes implemented in the computing environment 100.

Control starts at block 400 where site-B 104 synchronously receives write I/O data from site-A 102. Site-B 104 initiates (at block 402) the replication of the write I/O data to cache 116 and non-volatile storage 118 in site-B 104. In certain embodiments, the write I/O data may be also be destaged to the storage repository 120 and stored in space-efficient storage volumes 200a . . . 200n.

A determination is made (at block 404) as to whether the write I/O data been transferred to site-C 106 successfully. If so, a determination is made (at block 406) as to whether the write I/O data has been transferred to site-C 106 successfully before the write I/O data has been destaged to the storage repository 120 at site-B 104. Otherwise, the process waits (at block 405) and a determination (at block 404) is made once again as to whether write I/O data has been transferred to site-C 106 successfully.

If a determination is made (at block 406) that the write I/O data has not been transferred to site-C 106 successfully before the write I/O data has been destaged to the storage repository 120 at site-B 104, then destage to the storage repository 120 has caused an allocation of physical storage at the storage repository 120 of behalf of space efficient storage volumes 200a . . . 200n at site-B, and the storage space associated with the space efficient storage volumes 200a . . . 200n at site-B 104 is freed (at block 408).

If a determination is made (at block 406) that the write I/O data been transferred to site-C 106 successfully before the write I/O data has been destaged to the storage repository 120 then data in the cache 116 and non-volatile storage 118 are discarded.

Therefore, FIG. 4 illustrates certain embodiments in which data in cache 116 and non-volatile storage 118 is discarded at the second site 104, in response to determining that write I/O data from the host 108 to the first site 102 has been transferred successfully from the second site 104 to the third site 106 before the write I/O data has been destaged to the storage repository 120 at the second site 104. Furthermore, the storage associated with the space efficient storage volumes 200a . . . 200n at the second site is released, in response to determining that the write I/O data has not been transferred successfully from the second site 104 to the third site 106 before the write I/O data has been destaged to the storage repository 120 at the second site 104.

Figure 5:
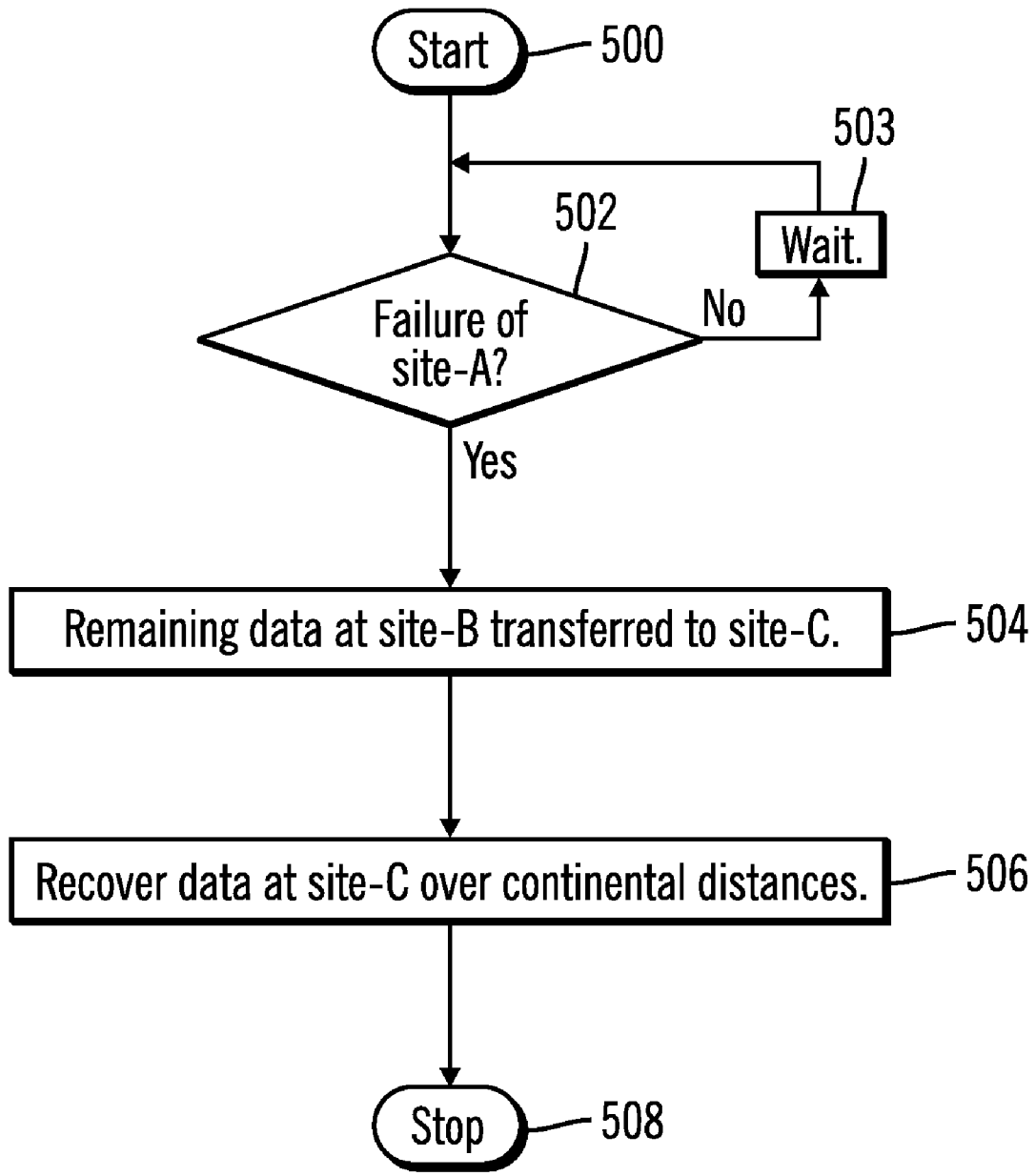
FIG. 5 illustrates operations performed in response to a failure of a local site, in accordance with certain embodiments.

FIG. 5 illustrates operations performed in response to a failure of a local site 102, in accordance with certain embodiments. The operations illustrated in FIG. 5 may be performed by one or more processes implemented in the computing environment 100.

Control starts at block 500, and proceeds to block 502 where a determination is made as to whether there has been a failure of site-A 102. If not, then the process waits (at block 503) and determines (at block 502) once again whether there has been a failure of site-A 102.

If a determination is made (at block 502) that there as been a failure of site-A then remaining data at site-B 104 is transferred (at block 504) to site-C 106. Data at site-C 106 is recovered (at block 506) over continental distances and the process stops (at block 508).

Therefore FIG. 5 illustrates certain embodiments in which if a production site, i.e., site-A 102, fails, then the remaining data at site-B 104 will be transferred to site-C 106, and the user can recover the data at site-C 106 with no data loss at continental distances. In FIG. 5, in response to a failure of the first site 102, remaining data at the second site 104 is transferred to the third site 106, wherein the remaining data is data that has yet to be transferred from the second site 106 to the third site 106 at the time of the failure of the first site 102. The third site 106 is then used for data recovery.

Figure 6:
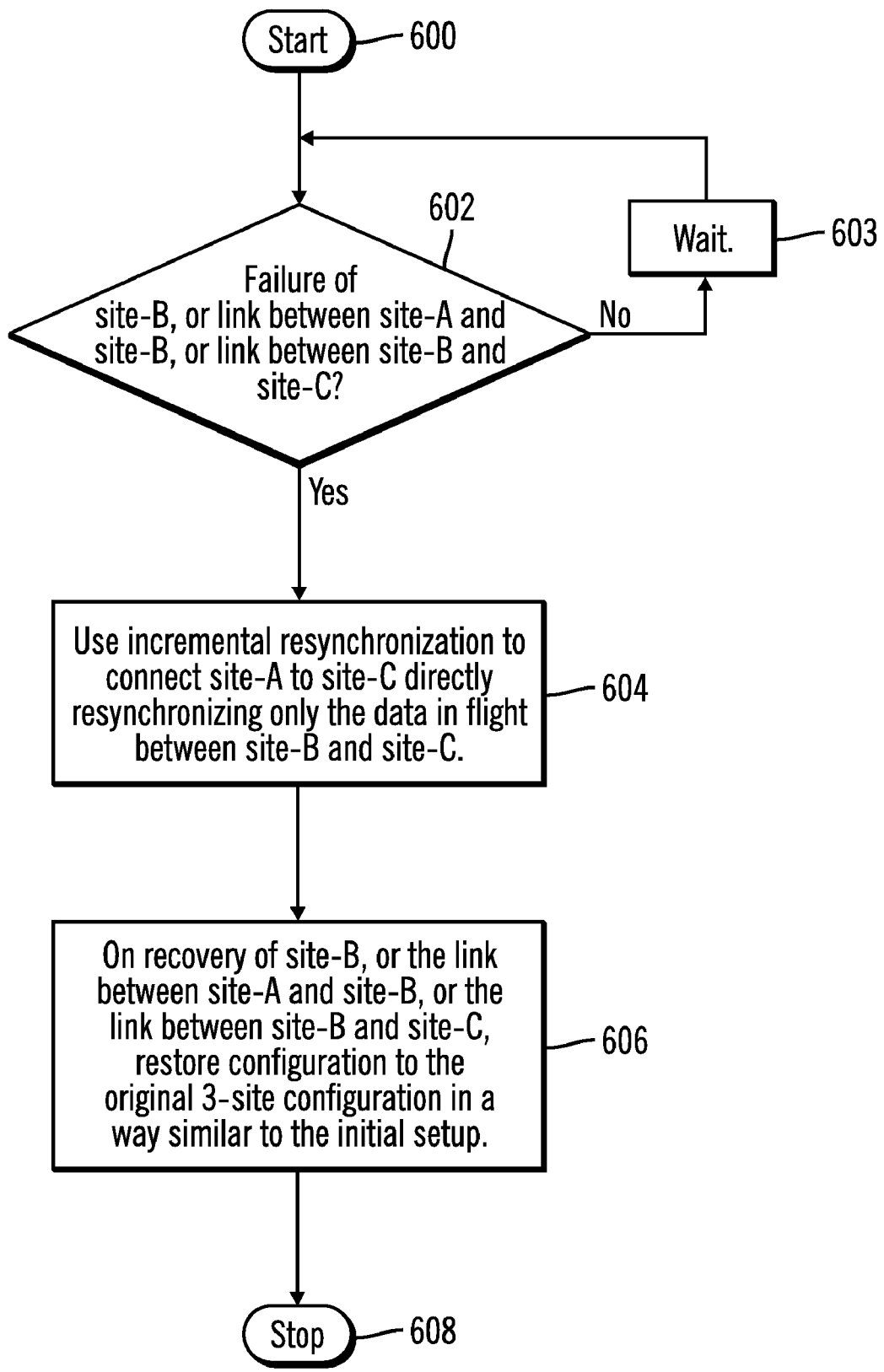
FIG. 6 illustrates operations performed in response to a failure of an intermediate site or in response to a failure of a link between the local site and the intermediate site, in accordance with certain embodiments.

FIG. 6 illustrates operations performed in response to a failure of an intermediate site 104 or in response to a failure of a link between the local site 102 and the intermediate site 104, or in response to a failure of a link between the intermediate site 104 and the remote site 106 in accordance with certain embodiments. The operations illustrated in FIG. 6 may be performed by one or more processes implemented in the computing environment 100.

Control starts at block 600 and proceeds to block 602 where a determination is made as to whether there has been a failure of site-B 104 or whether there has been a failure of the link between site-A 102 and site-B 104 or whether there has been a failure of the link between site-B 104 and site-C 106. If there has been no failure of site-B 104 and there has been no failure of the link between site-A 102 and site-B 104 and there has been no failure of the link between site-B 104 and site-C 106 then the process waits (at block 603) and a determination is made once again as to whether there has been a failure of site-B 104 or whether there has been a failure of the link between site-A 102 and site-B 104 or whether there has been a failure of the link between site-B 104 and site-C 106.

If a determination is made at block 602 that there has been a failure of site-B 104 or there has been a failure of the link between site-A 102 and site-B 104 or there has been a failure of the link between site-B 104 and site-C 106 then incremental resynchronization is used (at block 604) to connect site-A 102 to site-C 106 directly and only the data in flight is resynchronized between site-B 104 and site-C 106.

On recovery of site-B 104 or the link between site-A 102 and site-B 104, the process restores (at block 606) the configuration to the original 3-site configuration in a way similar to the initial setup, and the process stops (at block 608).

Therefore FIG. 6 illustrates certain embodiments in which if the site-B 104 fails, or if the link between site-A 102 and site-B 104 fails, or if the link between site-B 104 and site-C 106 fails then using incremental resynchronization the user can connect site-A 102 to site-C 106 directly and replication operations between site-A and site-C, resynchronizing only the tracks in flight. This allows production to continue, and also the continental distance backups to continue with a few seconds of data loss at continental distances (instead of zero data loss at continental distances). Once site-B 104, or the link between site-A 102 and site-B 104, or the link between site-B 104 and site-C 106 recovers, then the configuration can be restored to the original 3-site configuration in a way similar to the initial set up. In FIG. 6, in response to a failure of the second site 104 or the failure of a link between the first site 102 and the second site 104, or the failure of a link between the second site 104 and the third site 106, the first site 102 is connected to the third site 106. A resynchronizing between the first site 102 and the third site 106 is performed of the data in flight between the second site 104 and third site 106.

Figure 7:
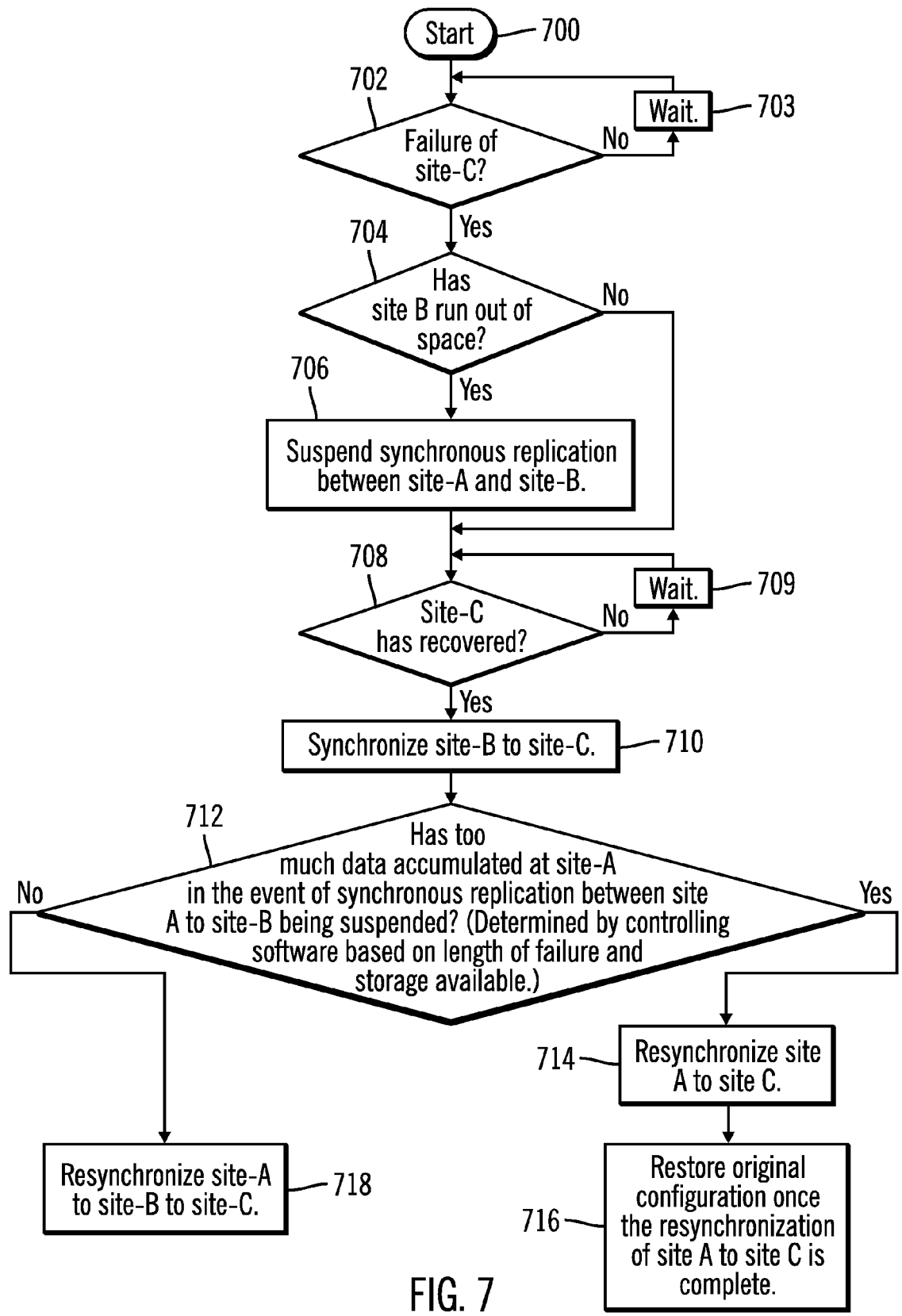
FIG. 7 illustrates operations performed in response to certain failures, in accordance with certain embodiments.

FIG. 7 illustrates operations performed in response to certain failures, in accordance with certain embodiments. The operations illustrated in FIG. 7 may be performed by one or more processes implemented in the computing environment 100.

Control starts at block 700 and proceeds to block 702, where a determination is made as to whether there is failure of site-C 106. If there has been no failure of site-C 106 then the process waits (at block 703) and control returns to block 702 where a determination is made once again as to whether there is failure of site-C 106.

If at block 702, a determination is made that there has been a failure of site-C 106, then a determination is made (at block 704) as to whether site-B 104 has run out of space. If so, then the process suspends (at block 706) synchronous replication between site-A 102 and site-B 104. Control proceeds to block 708, where a determination is made as to whether site-C 106 has recovered. If so, then the process synchronizes (at block 710) site-B 104 to site-C 106. If not, the process waits (at block 709) and control returns to block 708.

From block 710 control proceeds to block 712, where a determination is made as to whether too much data has accumulated at site-A 102 in the event of the synchronous replication between site-A 102 to site-B 104 being suspended. The determination of what is accumulation of too much data may be performed by controlling software based on the length of failure and storage available. If a determination is made that too much data has accumulated at site-A 102 then the process resynchronizes (at block 714) site-A 102 to site-C 106, and restores (at block 716) the original configuration once the resynchronization of site-A 102 to site-C 106 is complete If a determination is made at block 712 that too much data has not accumulated at site-A 102 in the event of the synchronous replication between site-A to site-B 104 being suspended, then the process resynchronizes site-A 102 to site-B 104 to site-C 106.

Therefore, FIG. 7 illustrates certain embodiments in which if site-C 106 fails, and is down for a significant period of time, and then site-B may run out of space, since the data lag between site-B 104 and site-C 106 will steadily grow larger. In such a case, the site-A 102 to site-B synchronous relationship may have to be suspended. Once the suspension occurs, the user may resynchronize site-B 104 to site-C 106 once site-B 104 or the link between site-B 104 and site-C 106 recovers and then site-A 102 is resynchronized to site-B 104 which is in turn resynchronized to site-C 106. However, if too much data has accumulated at site-A 102 while the link between site-A 102 to site-B 104 is suspended, then the resynchronization may have to be performed from site-A 102 to site-C 106, and the original configuration may be restored once the resynchronization is complete. In such embodiments, the choice as to whether to connect site-A 102 to site-C 106 directly or whether to attempt resynchronization of site-A 102 to site-B 104 to site-C 106 could be chosen proactively by controlling software based on the length of the failure, and the amount of repository storage available.

Certain embodiments significantly reduce the cost of storage at site-B 104. In certain embodiments volumes at site-B 104 are space efficient volumes with no physical storage allocated initially. As writes are received at site-B 104 from site-A 102, the writes will go into cache 116 and into non-volatile storage 118. If this data is transferred to the C volumes 122 before this data has been destaged to disk at site-B 104, then the data in cache 116 and non-volatile storage 118 may simply be discarded after the transfer completes successfully. If the process transfers this data to the C volumes 122 after the data has been destaged to disk 120, then the destage to disk will have caused an allocation of storage in the storage repository 120 on behalf of this space efficient B-volume. However, once the transfer to site-C 106 completes successfully, the storage allocated for this track in the storage repository 120 may be freed. In this way the amount of space consumed for the B-volumes is much less than the size of the full volume. The amount of storage consumed is related to the amount of time that the C volumes 122 lag the A and B volumes. In certain embodiments, this time may be around 3-5 seconds, although the time can elongate to larger lags if bandwidth is constrained or write activity peaks.

The user may choose how much storage to allocate in the storage repository 120 (which is common to many B-volumes). Allocating a very small amount of storage reduces the cost of implementing the embodiments, with the risk that if the storage repository 120 may run out of space (due to large lags between the B and C volumes). If the storage repository 120 runs out of space then the recovery solution described earlier may be used.

Additional Embodiment Details

The described techniques may be implemented as a method, apparatus or article of manufacture involving software, firmware, micro-code, hardware and/or any combination thereof. The term "article of manufacture" as used herein refers to code or logic implemented in a medium, where such medium may comprise hardware logic [e.g., an integrated circuit chip, Programmable Gate Array (PGA), Application Specific Integrated Circuit (ASIC), etc.] or a computer readable storage medium, such as magnetic storage medium (e.g., hard disk drives, floppy disks, tape, etc.), optical storage (CD-ROMs, optical disks, etc.), volatile and non-volatile memory devices [e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.]. Code in the computer readable storage medium is accessed and executed by a processor. The medium in which the code or logic is encoded may also comprise transmission signals propagating through space or a transmission media, such as an optical fiber, copper wire, etc. The transmission signal in which the code or logic is encoded may further comprise a wireless signal, satellite transmission, radio waves, infrared signals, Bluetooth, etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may comprise a combination of hardware and software components in which the code is embodied, processed, and executed. Of course, those skilled in the art will recognize that many modifications may be made without departing from the scope of embodiments, and that the article of manufacture may comprise any information bearing medium. For example, the article of manufacture comprises a storage medium having stored therein instructions that when executed by a machine results in operations being performed.

Certain embodiments can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, certain embodiments can take the form of a computer program product accessible from a computer usable or computer readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries. Additionally, a description of an embodiment with several components in communication with each other does not imply that all such components are required. On the contrary a variety of optional components are described to illustrate the wide variety of possible embodiments.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently.

When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article. The functionality and/or the features of a device may be alternatively embodied by one or more other devices which are not explicitly described as having such functionality/features. Thus, other embodiments need not include the device itself.

Figure 8:
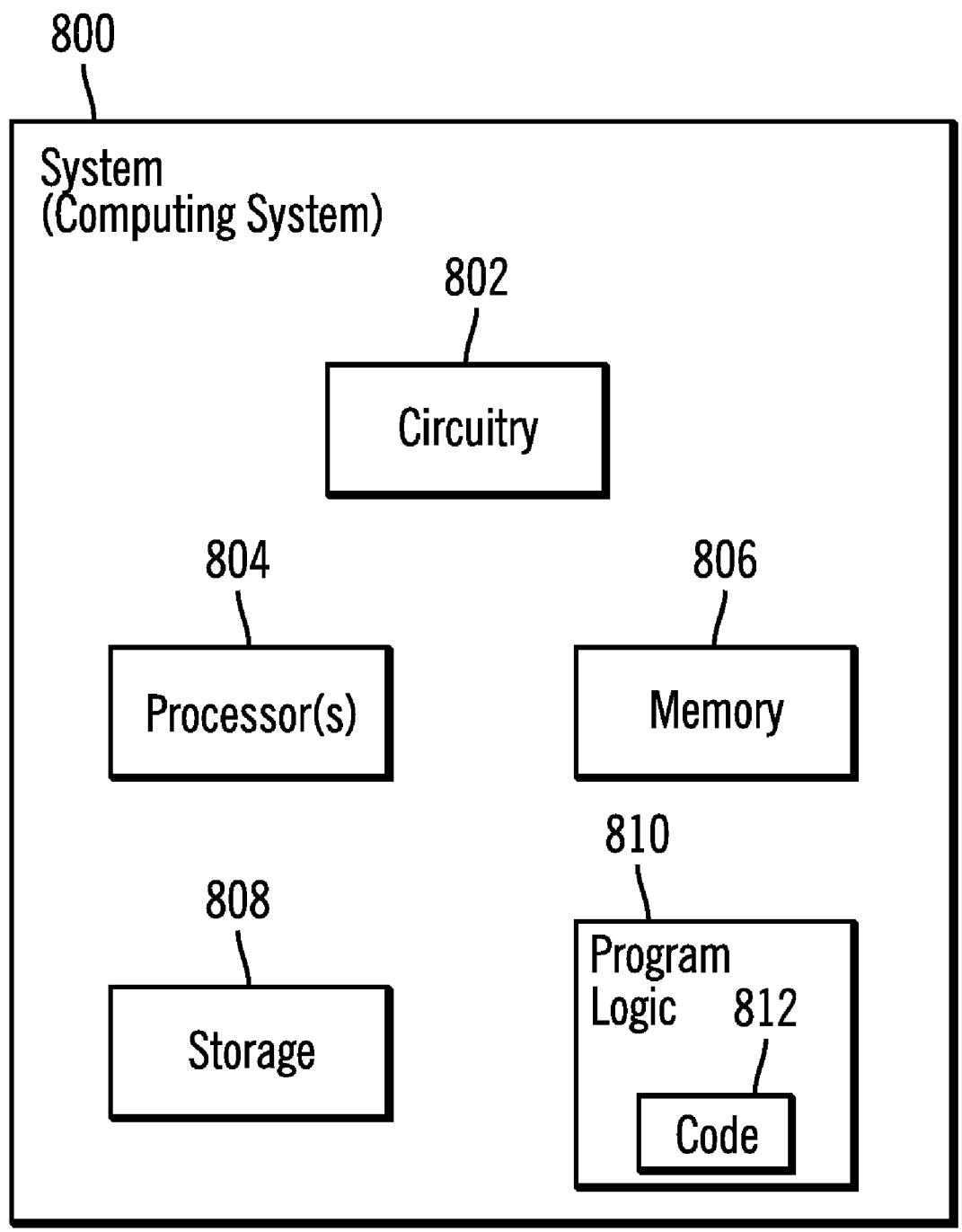
FIG. 8 illustrates a block diagram of a computer architecture in which certain described aspects of the embodiments are implemented.

FIG. 8 illustrates the architecture of computing system 800, wherein in certain embodiments the computational devices and storage control units comprising the local 102, intermediate 104, and remote 106 sites, and the host 108 of the computing environment 100 of FIG. 1 may be implemented in accordance with the architecture of the computing system 800. The computing system 800 may also be referred to as a system, and may include a circuitry 802 that may in certain embodiments include a processor 804. The system 800 may also include a memory 806 (e.g., a volatile memory device), and storage 808. The storage 808 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 808 may comprise an internal storage device, an attached storage device and/or a network accessible storage device. The system 800 may include a program logic 810 including code 812 that may be loaded into the memory 806 and executed by the processor 804 or circuitry 802. In certain embodiments, the program logic 810 including code 812 may be stored in the storage 808. In certain other embodiments, the program logic 810 may be implemented in the circuitry 802. Therefore, while FIG. 8 shows the program logic 810 separately from the other elements, the program logic 810 may be implemented in the memory 806 and/or the circuitry 802.

Certain embodiments may be directed to a method for deploying computing instruction by a person or automated processing integrating computer-readable code into a computing system, wherein the code in combination with the computing system is enabled to perform the operations of the described embodiments.

At least certain of the operations illustrated in FIGS. 1-8 may be performed in parallel as well as sequentially. In alternative embodiments, certain of the operations may be performed in a different order, modified or removed.

Furthermore, many of the software and hardware components have been described in separate modules for purposes of illustration. Such components may be integrated into a fewer number of components or divided into a larger number of components. Additionally, certain operations described as performed by a specific component may be performed by other components.

The data structures and components shown or referred to in FIGS. 1-8 are described as having specific types of information. In alternative embodiments, the data structures and components may be structured differently and have fewer, more or different fields or different functions than those shown or referred to in the figures. Therefore, the foregoing description of the embodiments has been presented for the purposes of illustration and description. It is not intended to be exhaustive or to limit the embodiments to the precise form disclosed. Many modifications and variations are possible in light of the above teaching.

What is claimed is:

1. A method, comprising:
   initiating synchronous replication of data, from a first site, to a second site;
   asynchronously sending at least one part of the data from the second site to a third site, wherein the asynchronously sent at least one part of the data is stored at the second site while the at least one part of data is in flight from the second site to the third site; and
   deleting the at least one part of the data stored at the second site, in response to the at least one part of the data being securely stored at the third site, and wherein in response to excess data accumulating at the first site in response to a suspension of the synchronous replication of data from the first site to the second site, resynchronizing the first site to the third site.

2. The method of claim 1, wherein the at least one part of the data is stored in a space efficient storage volume at the second site, wherein space efficient storage volumes are created as empty storage volumes, wherein a predefined amount of physical storage space is incrementally allocated for the space efficient storage volumes from a storage repository in response to writing to the space efficient storage volumes, and wherein the allocated physical storage space is returned to the storage repository in response to the physical storage space being no longer needed.

3. The method of claim 2, wherein the data is write Input/Output (I/O) data received from a host coupled to the first site, the method further comprising:
   discarding data in cache and non-volatile storage at the second site, in response to determining that the write I/O data has been transferred successfully from the second site to the third site before the write I/O data has been destaged to the storage repository at the second site; and
   releasing the physical storage space associated with the space efficient storage volumes at the second site, in response to determining that the write I/O data has not been transferred successfully from the second site to the third site before the write I/O data has been destaged to the storage repository at the second site.

4. The method of claim 1, wherein the first site, the second site, and the third site comprise storage controllers, and wherein the synchronous replication of data from the first site to the second site is performed in parallel with the asynchronous sending of the at least one part of the data from the second site to the third site, the method further comprising:

allocating a predetermined amount of storage to a storage repository at the second site, and in response to an exhaustion of storage space at the second site suspending the synchronous replication of data from the first site to the second site.

5. The method of claim 1, the method further comprising:

in response to a failure of the first site, transferring remaining data at the second site to the third site, wherein the remaining data is data that has yet to be transferred from the second site to the third site at the time of the failure of the first site, and using the third site for data recovery; and in response to a failure of the second site, or the failure of a link between the first site and the second site, or a failure of a link between the second and third site, connecting the first site to the third site and resynchronizing between the first site and the third site the data in flight between the second site and third site.

6. A system, comprising:

a first site;

a second site coupled to the first site;

a third site coupled to the second site;

at least one processor; and memory coupled to the at least one processor, wherein the at least one processor performs operations, the operations comprising:

(i) initiating synchronous replication of data, from the first site, to the second site;

(ii) asynchronously sending at least one part of the data from the second site to the third site, wherein the asynchronously sent at least one part of the data is stored at the second site while the at least one part of data is in flight from the second site to the third site; and (iii) deleting the at least one part of the data stored at the second site, in response to the at least one part of the data being securely stored at the third site, and wherein in response to excess data accumulating at the first site in response to a suspension of the synchronous replication of data from the first site to the second site, resynchronizing the first site to the third site.

7. The system of claim 6, wherein the at least one part of the data is stored in a space efficient storage volume at the second site, wherein space efficient storage volumes are created as empty storage volumes, wherein a predefined amount of physical storage space is incrementally allocated for the space efficient storage volumes from a storage repository in response to writing to the space efficient storage volumes, and wherein the allocated physical storage space is returned to the storage repository in response to the physical storage space being no longer needed.

8. The system of claim 7, wherein the data is write Input/Output (I/O) data received from a host coupled to the first site, the system further comprising:

cache included in the second site; and non-volatile storage included in the second site, wherein the operations further comprise:

(i) discarding data in the cache and the non-volatile storage at the second site, in response to determining that the write I/O data has been transferred successfully from the second site to the third site before the write I/O data has been destaged to the storage repository at the second site; and (ii) releasing the physical storage space associated with the space efficient storage volumes at the second site, in response to determining that the write I/O data has not been transferred successfully from the second site to the third site before the write I/O data has been destaged to the storage repository at the second site.

9. The system of claim 6, wherein the first site, the second site, and the third site comprise storage controllers, and wherein the synchronous replication of data from the first site to the second site is performed in parallel with the asynchronous sending of the at least one part of the data from the second site to the third site, the operations further comprising:

allocating a predetermined amount of storage to a storage repository at the second site, and in response to an exhaustion of storage space at the second site suspending the synchronous replication of data from the first site to the second site.

10. The system of claim 6, the operations further comprising:

in response to a failure of the first site, transferring remaining data at the second site to the third site, wherein the remaining data is data that has yet to be transferred from the second site to the third site at the time of the failure of the first site, and using the third site for data recovery; and in response to a failure of the second site, or the failure of a link between the first site and the second site, or a failure of a link between the second and third site, connecting the first site to the third site and resynchronizing between the first site and the third site the data in flight between the second site and third site.

11. A method, comprising:

deploying computing infrastructure, comprising integrating computer-readable code into a first site, a second site, and a third site;

initiating, via execution of the code by a processor, synchronous replication of data, from the first site, to the second site;

asynchronously sending, via execution of the code, at least one part of the data from the second site to the third site, wherein the asynchronously sent at least one part of the data is stored at the second site while the at least one part of data is in flight from the second site to the third site; and deleting, via execution of the code, the at least one part of the data stored at the second site, in response to the at least one part of the data being securely stored at the third site, and wherein in response to excess data accumulating at the first site in response to a suspension of the synchronous replication of data from the first site to the second site, resynchronizing the first site to the third site.

12. The method of claim 11, wherein the at least one part of the data is stored in a space efficient storage volume at the second site, wherein space efficient storage volumes are created as empty storage volumes, wherein a predefined amount of physical storage space is incrementally allocated for the space efficient storage volumes from a storage repository in response to writing to the space efficient storage volumes, and wherein the allocated physical storage space is returned to the storage repository in response to the physical storage space being no longer needed.

13. The method of claim 12, wherein the data is write Input/Output (I/O) data received from a host coupled to the first site, wherein the code in combination with the first site, the second site, and the third site is further capable of performing:

discarding data in cache and non-volatile storage at the second site, in response to determining that the write I/O data has been transferred successfully from the second site to the third site before the write I/O data has been destaged to the storage repository at the second site; and releasing the physical storage space associated with the space efficient storage volumes at the second site, in response to determining that the write I/O data has not been transferred successfully from the second site to the third site before the write I/O data has been destaged to the storage repository at the second site.

14. The method of claim 11, wherein the first site, the second site, and the third site comprise storage controllers, and wherein the synchronous replication of data from the first site to the second site is performed in parallel with the asynchronous sending of the at least one part of the data from the second site to the third site, wherein the code in combination with the first site, the second site, and the third site is further capable of performing:

allocating a predetermined amount of storage to a storage repository at the second site, and in response to an exhaustion of storage space at the second site suspending the synchronous replication of data from the first site to the second site.

15. The method of claim 11, wherein the code in combination with the first site, the second site, and the third site is further capable of performing:

in response to a failure of the first site, transferring remaining data at the second site to the third site, wherein the remaining data is data that has yet to be transferred from the second site to the third site at the time of the failure of the first site, and using the third site for data recovery; and in response to a failure of the second site, or the failure of a link between the first site and the second site, or a failure of a link between the second and third site, connecting the first site to the third site and resynchronizing between the first site and the third site the data in flight between the second site and third site.

16. A system, comprising:
a first site;
a second site coupled to the first site;
a third site coupled to the second site;
means for initiating synchronous replication of data, from the first site, to the second site;
means for asynchronously sending at least one part of the data from the second site to the third site, wherein the asynchronously sent at least one part of the data is stored at the second site while the at least one part of data is in flight from the second site to the third site; and
means for deleting the at least one part of the data stored at the second site, in response to the at least one part of the data being securely stored at the third site; and
means for resynchronizing the first site to the third site, in response to excess data accumulating at the first site in response to a suspension of the synchronous replication of data from the first site to the second site.

17. The system of claim 16, wherein the at least one part of the data is stored in a space efficient storage volume at the second site, wherein space efficient storage volumes are created as empty storage volumes, wherein a predefined amount of physical storage space is incrementally allocated for the space efficient storage volumes from a storage repository in response to writing to the space efficient storage volumes, and wherein the allocated physical storage space is returned to the storage repository in response to the physical storage space being no longer needed.

18. The system of claim 17, wherein the data is write Input/Output (I/O) data received from a host coupled to the first site, the system further comprising:

means for discarding data in cache and non-volatile storage at the second site, in response to determining that the write I/O data has been transferred successfully from the second site to the third site before the write I/O data has been destaged to the storage repository at the second site; and means for releasing the physical storage space associated with the space efficient storage volumes at the second site, in response to determining that the write I/O data has not been transferred successfully from the second site to the third site before the write I/O data has been destaged to the storage repository at the second site.

19. The system of claim 16, wherein the first site, the second site, and the third site comprise storage controllers, and wherein the synchronous replication of data from the first site to the second site is performed in parallel with the asynchronous sending of the at least one part of the data from the second site to the third site, the system further comprising:

means for allocating a predetermined amount of storage to a storage repository at the second site, and in response to an exhaustion of storage space at the second site suspending the synchronous replication of data from the first site to the second site.

20. The system of claim 16, further comprising:

means for in response to a failure of the first site, transferring remaining data at the second site to the third site, wherein the remaining data is data that has yet to be transferred from the second site to the third site at the time of the failure of the first site, and using the third site for data recovery; and means for connecting the first site to the third site and resynchronizing between the first site and the third site the data in flight between the second site and third site, in response to a failure of the second site, or the failure of a link between the first site and the second site, or a failure of a link between the second and third site.

21. A computer readable storage medium, wherein the computer readable storage medium includes machine readable instructions stored thereon, wherein the machine readable instructions cause operations on one or more storage sites comprising a first site, a second site, and a third site, the operations comprising:

initiating synchronous replication of data, from the first site, to the second site;

asynchronously sending at least one part of the data from the second site to the third site, wherein the asynchronously sent at least one part of the data is stored at the second site while the at least one part of data is in flight from the second site to the third site; and deleting the at least one part of the data stored at the second site, in response to the at least one part of the data being securely stored at the third site, and wherein in response to excess data accumulating at the first site in response to a suspension of the synchronous replication of data from the first site to the second site, resynchronizing the first site to the third site.

22. The computer readable storage medium of claim 21, wherein the at least one part of the data is stored in a space efficient storage volume at the second site, wherein space efficient storage volumes are created as empty storage volumes, wherein a predefined amount of physical storage space is incrementally allocated for the space efficient storage volumes from a storage repository in response to writing to the space efficient storage volumes, and wherein the allocated physical storage space is returned to the storage repository in response to the physical storage space being no longer needed.

23. The computer readable storage medium of claim 22, wherein the data is write Input/Output (I/O) data received from a host coupled to the first site, the operations further comprising:
- discarding data in cache and non-volatile storage at the second site, in response to determining that the write I/O data has been transferred successfully from the second site to the third site before the write I/O data has been destaged to the storage repository at the second site; and
- releasing the physical storage space associated with the space efficient storage volumes at the second site, in response to determining that the write I/O data has not been transferred successfully from the second site to the third site before the write I/O data has been destaged to the storage repository at the second site.

24. The computer readable storage medium of claim 21, wherein the first site, the second site, and the third site comprise storage controllers, and wherein the synchronous replication of data from the first site to the second site is performed in parallel with the asynchronous sending of the at least one part of the data from the second site to the third site, the operations further comprising:
- allocating a predetermined amount of storage to a storage repository at the second site, and in response to an exhaustion of storage space at the second site suspending the synchronous replication of data from the first site to the second site.

25. The computer readable storage medium of claim 21, the operations further comprising:
- in response to a failure of the first site, transferring remaining data at the second site to the third site, wherein the remaining data is data that has yet to be transferred from the second site to the third site at the time of the failure of the first site, and using the third site for data recovery; and
- in response to a failure of the second site, or the failure of a link between the first site and the second site, or a failure of a link between the second and third site, connecting the first site to the third site and resynchronizing between the first site and the third site the data in flight between the second site and third site.

26. A computer readable storage medium, wherein the computer readable storage medium includes machine readable instructions stored thereon, wherein the machine readable instructions cause operations on one or more storage sites comprising a first site, a second site, and a third site, the operations comprising:
- initiating synchronous replication of data, from the first site, to the second site;
- asynchronously sending at least one part of the data from the second site to the third site, wherein the asynchronously sent at least one part of the data is stored at the second site while the at least one part of data is in flight from the second site to the third site; and
- deleting the at least one part of the data stored at the second site, in response to the at least one part of the data being securely stored at the third site, wherein the at least one part of the data is stored in a space efficient storage volume at the second site, wherein space efficient storage volumes are created as empty storage volumes, wherein a predefined amount of physical storage space is incrementally allocated for the space efficient storage volumes from a storage repository in response to writing to the space efficient storage volumes, wherein the allocated physical storage space is returned to the storage repository in response to the physical storage space being no longer needed, and wherein the data is write Input/Output (I/O) data received from a host coupled to the first site, the operations further comprising:
- discarding data in cache and non-volatile storage at the second site, in response to determining that the write I/O data has been transferred successfully from the second site to the third site before the write I/O data has been destaged to the storage repository at the second site; and
- releasing the physical storage space associated with the space efficient storage volumes at the second site, in response to determining that the write I/O data has not been transferred successfully from the second site to the third site before the write I/O data has been destaged to the storage repository at the second site.

27. The computer readable storage medium of claim 26, wherein the first site, the second site, and the third site comprise storage controllers, and wherein the synchronous replication of data from the first site to the second site is performed in parallel with the asynchronous sending of the at least one part of the data from the second site to the third site, the operations further comprising:
- allocating a predetermined amount of storage to a storage repository at the second site, and in response to an exhaustion of storage space at the second site suspending the synchronous replication of data from the first site to the second site; and
- in response to excess data accumulating at the first site in response to a suspension of the synchronous replication of data from the first site to the second site, resynchronizing the first site to the third site.

28. The computer readable storage medium of claim 26, the operations further comprising:
- in response to a failure of the first site, transferring remaining data at the second site to the third site, wherein the remaining data is data that has yet to be transferred from the second site to the third site at the time of the failure of the first site, and using the third site for data recovery; and
- in response to a failure of the second site, or the failure of a link between the first site and the second site, or a failure of a link between the second and third site, connecting the first site to the third site and resynchronizing between the first site and the third site the data in flight between the second site and third site.

* * * * *